(12) United States Patent
Pohl

(10) Patent No.: US 6,682,010 B2
(45) Date of Patent: Jan. 27, 2004

(54) OPTICAL FIBER WINDING APPARATUS AND METHOD

(75) Inventor: Brent Pohl, Timonium, MD (US)

(73) Assignee: Dorsal Networks, Inc., Columbia, MD (US)

( * ) Notice: Subject to any disclaimer, the term of this patent is extended or adjusted under 35 U.S.C. 154(b) by 119 days.

(21) Appl. No.: 09/927,440

(22) Filed: Aug. 13, 2001

(65) Prior Publication Data

US 2003/0029956 A1 Feb. 13, 2003

(51) Int. Cl.[7] .............................. B65H 75/38; G02B 6/00
(52) U.S. Cl. .................... 242/386; 242/419; 242/472.6; 242/474.4; 242/487; 242/901; 385/135
(58) Field of Search ............................... 242/901, 472.6, 242/386, 419, 474.4, 487; 385/135

(56) References Cited

U.S. PATENT DOCUMENTS

| | | | | |
|---|---|---|---|---|
| 2,429,330 A | * | 10/1947 | Roberts | 242/419 |
| 3,389,868 A | * | 6/1968 | Majkrzak | 242/901 |
| 4,088,275 A | * | 5/1978 | Ramos | 242/419 |
| 5,982,971 A | | 11/1999 | Amirkalali | |
| 6,042,043 A | | 3/2000 | Wislinski | |
| 6,073,877 A | | 6/2000 | Wislinski | |
| 6,263,142 B1 | | 7/2001 | Mardirossian et al. | |
| 6,295,901 B1 | | 10/2001 | Mardirossian | |
| 6,330,390 B1 | | 12/2001 | Wislinski | |

OTHER PUBLICATIONS

Raymond et al., "AT&T Technical Journal", Jan./Feb. 1995, vol. 74, pp. 1–102.

* cited by examiner

Primary Examiner—John Q. Nguyen

(57) ABSTRACT

An optical fiber winding apparatus includes a base, a plurality of fiber containment devices connected to the base, and a fiber guider connected to and movable in a repeatable path with respect to the base, wherein the guider winds the fiber around the fiber containment devices. The apparatus is hand-held, and the path of the guider overlaps itself in a single cycle of the path, such as a figure-eight.

45 Claims, 3 Drawing Sheets

OPTICAL FIBER WINDING APPARATUS AND METHOD

FIELD OF THE INVENTION

The present invention generally relates to an optical fiber winding apparatus and more particularly to a system and method for winding fiber fixed at both ends.

BACKGROUND OF THE INVENTION

An excessive length of optical fiber is often required to connect two or more optical components. Once these optical components are connected, an excess fiber slack is created between them, especially if the optical components are intended to be proximal to each other. This fiber slack must be taken up by winding or coiling it. This process can be time-consuming and, if poorly done, can result in tangling or damaging the fiber.

U.S. Pat. No. 6,073,877 to Wislinski discloses a fiber winding and storage assembly in which a loose optical fiber with both ends free is manually wrapped around a fiber storage device. There is a need for an apparatus that winds a fiber with fixed ends. There is also a need for an apparatus that winds a fiber automatically, more systematically, or more quickly than in the prior art. The present invention aims to solve these problems. Other advantages of the present invention will be obvious to one skilled in the art.

SUMMARY OF THE INVENTION

In one aspect of the present invention, an optical fiber winding apparatus comprises a base, a plurality of fiber containment devices connected to the base, and a fiber guider connected to and movable in a repeatable path with respect to the base, wherein the guider winds the fiber around the fiber containment devices. In another aspect, the apparatus is hand-held and the path of the guider overlaps itself in a single cycle of the path, such as a figure-eight.

In another aspect of the present invention, a method of winding optical fiber comprises threading the fiber into a fiber guider that is movably connected to a base, and moving the guider in a repeatable path about a plurality of fiber containment devices that are connected to the base to wind the fiber around the fiber containment devices. In yet another aspect, the apparatus is hand-held and the path of the guider overlaps itself in a single cycle of the path, such as a figure-eight.

In a further aspect of the present invention, a method of winding slack optical fiber between optical components provides a plurality of optical components, connects the components with optical fiber, threads the fiber into an optical fiber winding apparatus, and operates the apparatus. In another aspect, the method further comprises winding the fiber in a figure-eight configuration and unthreading the fiber from the apparatus.

DETAILED DESCRIPTION OF THE PREFERRED EMBODIMENTS

Figure 1:
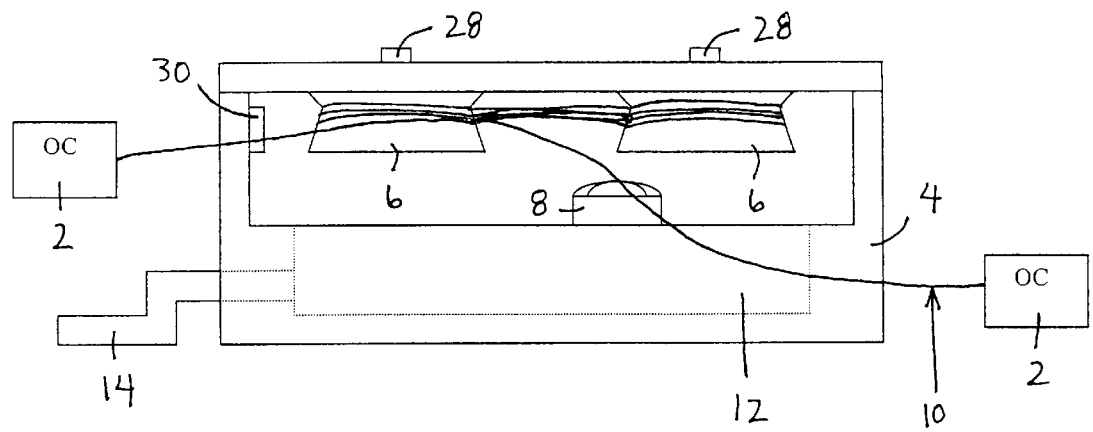
FIG. 1 is a side view of a preferred embodiment of the present invention.

Referring to FIG. 1, a fiber winder is placed between two optical components 2 that are connected with an optical fiber 10. The fiber winder includes a base 4, spools 6, and a guider 8. The spools 6 are attached to the base 4, and may generally be referred to as one type of fiber containment device. The spools 6 may be individually attached to the base 4 or may be integrated into a single piece, cartridge, or spooling tray that is attached to the base 4. The guider 8 is movably attached to the base 4. The fiber winder may be hand-held.

As shown in FIG. 1, a hand crank 14 is connected to the guider 8 via a transmission 12. The transmission 12 may be implemented with gears, pulleys, and/or belts, and serves to transmit movement of the hand crank 14 to movement of the guider 8.

The base 4 further includes a retainment member 30 for holding a region of the optical fiber 10 in place with respect to the base 4 of the fiber winder. The retainment member 30 may be implemented, for example, as a clamp that is opened and closed by an operator and, when closed, clamps down on the fiber 10 to prevent it from slipping. The retainment member 30 is preferably formed with a material, such as an elastomeric material, that will not damage the fiber 10 when it retains the fiber. Other devices and materials for use as the retainment member 30 will be obvious to one skilled in the art.

There are, preferably, an even number of spools 6. The spools 6 may be approximately cylindrical, with a minimum radius different from a maximum radius, as shown in FIG. 1. With this shape, the fiber 10 will preferentially accumulate in the region of minimum radius, so that the fiber 10 does not get tangled as the guider 8 winds the fiber around the spools 6. In addition, the wound fiber 10 will not easily or accidentally slide off the spools 6. The spools 6 preferably have a minimum radius that is larger than a minimum radius of curvature of the fiber 10 to prevent damage to the fiber 10. If the fiber 10 is bent into a shape with a radius less than its minimum radius of curvature, it can break or otherwise be damaged. For example, a minimum radius of the spools 6 could be about 25 mm, although this could vary. Other useful shapes and sizes for the spools 6 would be obvious to one skilled in the art. Further, the spools 6 could be implemented as a removable cartridge.

The spools 6 each include a release 28. The releases 28 are configured to remove the spools 6 from the base 4. In an alternative embodiment, the releases 28 may be configured to release the wound fiber 10 from the spools 6.

Figure 3:
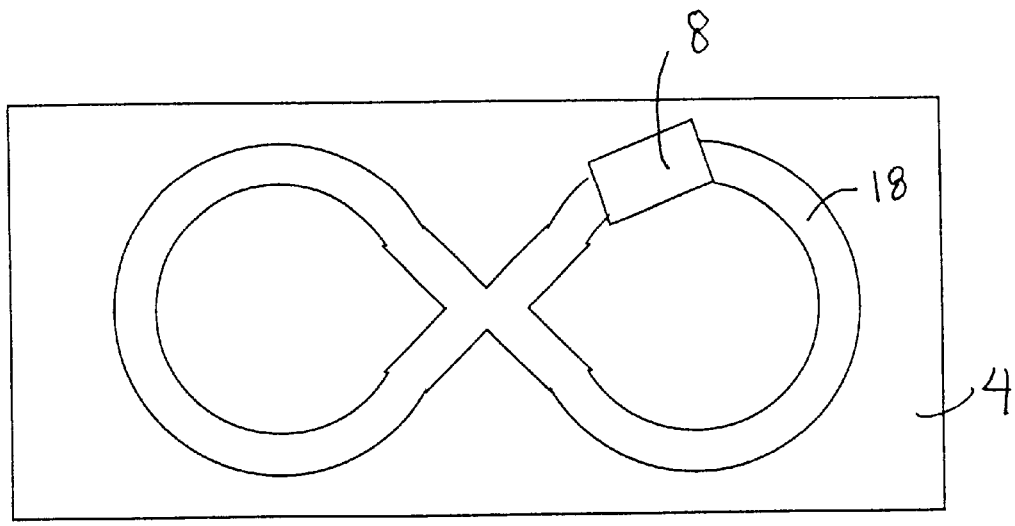
FIG. 3 is a top view of the base 4 of the embodiment shown in FIG. 2.

The guider 8 moves in a repeatable cycle with rotation of the hand crank 14 via the transmission 12. For example, the guider 8 may move in a figure-eight path, as shown in FIG. 3 and described hereinafter. However, from a side view, as shown in FIG. 1, the guider 8 moves laterally (left-right) across the base 4. It is the cyclical motion of the guider 8 that winds the fiber 10 around the spools 6.

Figure 2:
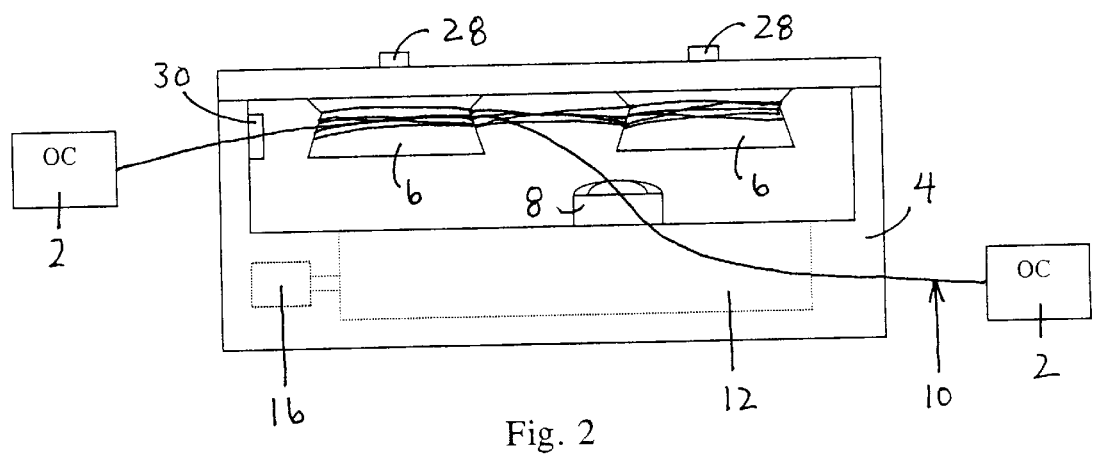
FIG. 2 is a side view of another preferred embodiment of the present invention.

Referring to FIG. 2, in another aspect of the present invention, the base 4 includes a motor 16 in place of a hand crank 14. The motor 16 preferably includes, for example, an electric motor and an on-off switch (not shown) for operating the motor 16. The motor 16 is connected to the guider 8 via the transmission 12.

Figure 4:
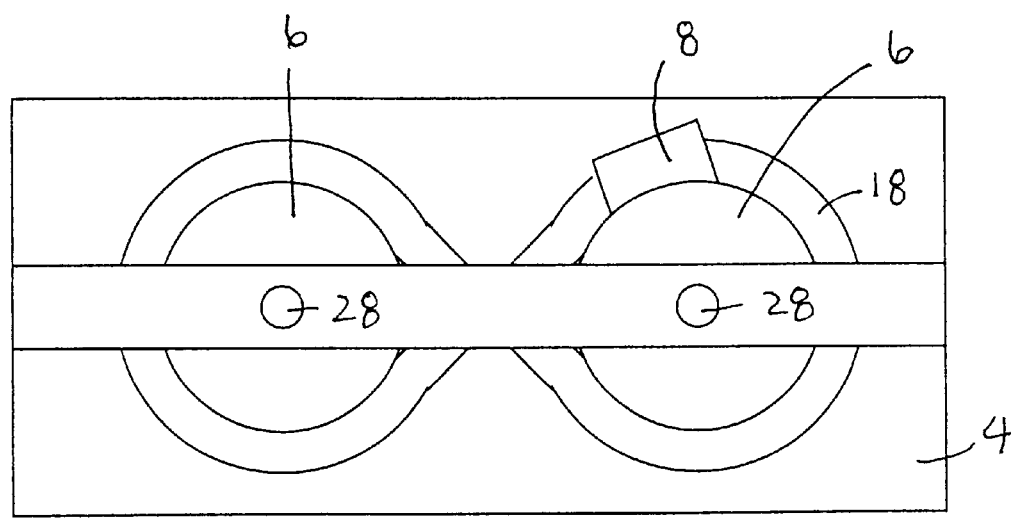
FIG. 4 is a top view of the embodiment shown in FIG. 2.

Referring now to FIGS. 3 and 4, the base 4 further includes a path 18. When power is supplied to the guider 8 from the hand crank 14 or the motor 16 via the transmission 12, the guider 8 follows the path 18. In order to prevent torsional loading on the fiber—i.e. twisting of the fiber—the path is preferably implemented with a figure-eight configuration, although other path configurations will be obvious to one skilled in the art. For example, the path could also be a cloverleaf configuration or any repeatable path that overlaps itself in a single cycle of the path. While a preferred direction of movement of the guider 8 along the path 18 is not specified, the guider 8 preferably continues along the path 18 in the same direction throughout the winding process to wind the fiber 10 around the spools 6. The fiber winder could also unwind a fiber 10 from the spools 6 by reversing the direction of the guider 8 around the path 18.

Figure 5:
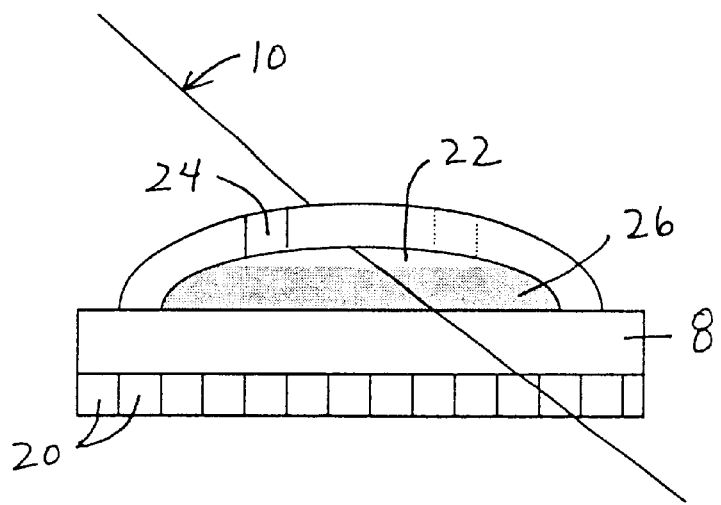
FIG. 5 is a side view of the guider 8.
Figure 6:
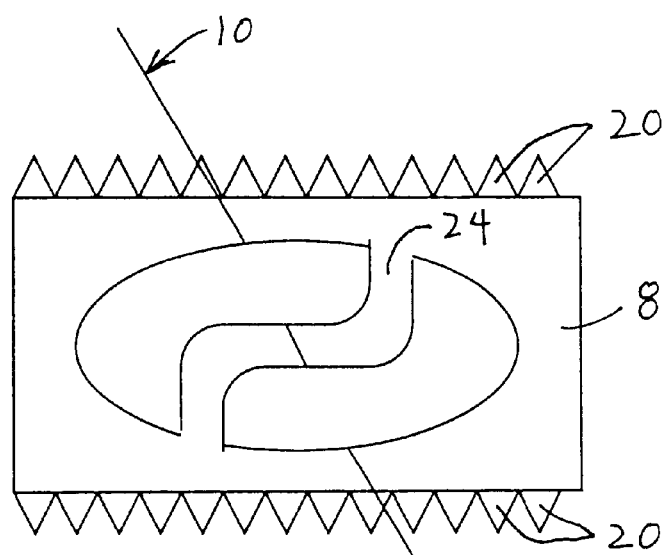
FIG. 6 is a top view of the guider 8 shown in FIG. 5.

Referring now to FIGS. 5 and 6, the guider 8 includes an eyelet 22, an opening 24, a resistor 26, and gears 20. The guider 8 serves to guide the fiber 10 around the spools 6 while following path 18. The guider 8 is connected to the transmission 12 via gears 20, although other means of connecting the guider 8 to the transmission 12 will be obvious to one skilled in the art.

The fiber 10 can move relatively freely through the eyelet 22. In one aspect of the present invention, the movement of the fiber 10 through the eyelet 22 is slightly resisted by the resistor 26. The resistor 26 includes a friction-inducing material, such as an elastomer or rubber material, and makes sufficient contact with the fiber 10 to provide some resistance to movement of the fiber 10 through the eyelet 22. The resistance of the resistor 26 enables the fiber 10 to be tightly wound around the spools 6. If the resistor 26 provides too little resistance, then the fiber 10 may be too loosely wound around the spools 6. However, if the resistor 26 provides too much resistance, then the fiber 10 could be damaged.

The eyelet 22 has an opening 24 in its periphery. Because the fiber 10 is connected at either end to an optical component 2, an opening 24 is necessary for threading the fiber 10 into the eyelet 22 of the guider 8. The opening 24 is configured so that, by slightly bending the fiber 10, the fiber 10 can be threaded by hand into the eyelet 22. However, as shown in FIG. 6, once the fiber 10 is threaded into the eyelet 22, it is not easily removed by the motion of the guider 8. In other words, it requires a specific removing or unthreading action by an operator to remove the fiber 10 from the eyelet 22.

The following description explains the operation of the fiber winder. The fiber winder is placed between two optical components 2 that are connected by an optical fiber 10. An operator clamps a region of the fiber 10 to the retainment member 30, taking care not to damage the fiber 10. Then, the operator threads the fiber 10 into the guider 8 by bending and moving the fiber 10 so that it fits into the opening 24. When the operator releases the fiber 10, the fiber 10 naturally straightens, as shown in FIG. 6, so that it does not easily slip out of the eyelet 22 of the guider 8. The operator then provides power to move the guider 8 through a path 18 shown in FIG. 3. This power can be in the form of power supplied by hand to the hand crank 14 (by turning the crank) or power supplied by the motor 16. As the guider 8 moves around the path 18, the fiber 10 is wound around the spools 6 in the configuration determined by the path 18, such as a figure-eight configuration.

When the slack of fiber 10 has been removed between optical components 2 by winding the fiber 10 around the spools 6, the operator stops providing power to the guider 8. The operator removes the fiber 10 from the guider 8 via opening 24 and unclamps the fiber 10 from the retainment member 30. The operator removes the wound fiber from the fiber winder by activating the releases 28. Activating the releases 28 will either release the spools 6 from the base 4, or will release the wound fiber 10 from the spools 6.

The foregoing description of a preferred embodiment of the invention has been presented for purposes of illustration and description. It is not intended to be exhaustive or to limit the invention to the precise form disclosed, and modifications and variations are possible in light in the above teachings or may be acquired from practice of the invention. The embodiment was chosen and described to explain the principles of the invention and as a practical application to enable one skilled in the art to utilize the invention in various embodiments and with various modifications suited to the particular use contemplated. It is intended that the scope of the invention be defined by the claims appended hereto and their equivalents.

What is claimed is:

1. An optical fiber winding apparatus, comprising:
   a base;
   a plurality of fiber containment devices connected to the base; and
   a fiber guider connected to and movable in a repeatable path with respect to the base, the fiber guider including a resistor to resist movement of the fiber within the fiber guider while preventing overtightening of the fiber about the plurality of fiber containment devices,
   wherein the guider winds the fiber around the fiber containment devices.

2. An optical fiber winding apparatus as in claim 1, wherein the apparatus is hand-held.

3. An optical fiber winding apparatus as in claim 1, wherein the path of the guider overlaps itself in a single cycle of the path.

4. An optical fiber winding apparatus as in claim 3, wherein the path is a figure-eight.

5. An optical fiber winding apparatus as in claim 1, wherein the fiber containment devices are removable from the base with fiber wound thereon.

6. An optical fiber winding apparatus as in claim 1, further comprising a power source for moving the guider.

7. An optical fiber winding apparatus as in claim 6, wherein the power source comprises a hand crank.

8. An optical fiber winding apparatus as in claim 6, wherein the power source comprises a motor.

9. An optical fiber winding apparatus as in claim 8, wherein the motor provides a constant force on the guider.

10. An optical fiber winding apparatus as in claim 6, further comprising a transmission to transmit motion from the power source to the guider.

11. An optical fiber winding apparatus as in claim 10, wherein the transmission comprises a gear.

12. An optical fiber winding apparatus as in claim 1, wherein the fiber containment devices are approximately cylindrical.

13. An optical fiber winding apparatus as in claim 1, wherein a fiber containment device is a spool.

14. An optical fiber winding apparatus as in claim 1, wherein a number of fiber containment devices is even.

15. An optical fiber winding apparatus as in claim 1, wherein each end of the fiber is fixed to an apparatus external to the fiber winding apparatus.

16. An optical fiber winding apparatus as in claim 15, wherein the apparatus is disposed between two optical components.

17. An optical fiber winding apparatus as in claim 16, wherein the optical components are separated by a distance of less than 25 m.

18. An optical fiber winding apparatus as in claim 16, wherein the minimum radius of the fiber containment devices is about 25 mm.

19. An optical fiber winding apparatus as in claim 1, wherein the guider comprises an eyelet.

20. An optical fiber winding apparatus as in claim 19, wherein the eyelet comprises an opening in its perimeter.

21. An optical fiber winding apparatus as in claim 1, wherein the resistor comprises rubber or other elastomeric material.

22. An optical fiber winding apparatus as in claim 1, wherein the fiber containment devices comprise a release for releasing wound fiber from a top of the containment devices.

23. An optical fiber winding apparatus as in claim 1, wherein the fiber containment devices each have a minimum radius and a maximum radius different from the minimum radius.

24. An optical fiber winding apparatus as in claim 1, further comprising a fiber retainment member connected to the base for retaining the fiber.

25. An optical fiber winding apparatus as in claim 1, wherein a minimum radius of each of the fiber containment devices is greater than a minimum radius of curvature of the fiber.

26. A method of winding optical fiber, comprising:
   threading the fiber into a fiber guider that is movably connected to a base;
   moving the guider in a repeatable path about a plurality of fiber containment devices that are connected to the base to wind the fiber around the fiber containment devices;
   resisting movement of the fiber within the guider while moving the guider in the repeatable path; and
   preventing overtightening of the fiber about the plurality of fiber containment devices with the guider.

27. A method of winding optical fiber as in claim 26, wherein the base is hand-held.

28. A method of winding optical fiber as in claim 26, wherein moving the guider comprises moving the guider in a path that overlaps itself in a single cycle of the path.

29. A method of winding optical fiber as in claim 28, wherein the path is a figure-eight.

30. A method of winding optical fiber as in claim 26, further comprising removing the fiber containment devices from the base.

31. A method of winding optical fiber as in claim 26, wherein resisting movement of the fiber comprises providing approximately constant resistance.

32. A method of winding optical fiber as in claim 26, wherein resisting movement of the fiber comprises an approximately constant tensile force on the fiber.

33. A method of winding optical fiber as in claim 26, wherein moving the guider comprises moving the guider with one of a hand crank and a motor.

34. A method of winding optical fiber as in claim 26, wherein a number of fiber containment devices is even.

35. A method of winding optical fiber as in claim 26, further comprising removing the fiber from a top of the fiber containment devices.

36. A method of winding optical fiber as in claim 26, wherein a minimum radius of each of the fiber containment devices is greater than a minimum radius of curvature of the fiber.

37. A method of winding optical fiber as in claim 36, wherein the minimum radius of each of the fiber containment devices is about 25 mm.

38. A method of winding optical fiber as in claim 26, further comprising movably securing the fiber in the guider.

39. A method of winding optical fiber as in claim 26, wherein the fiber containment devices each have a minimum radius and a maximum radius different from the minimum radius.

40. A method of winding optical fiber as in claim 26, wherein the fiber containment devices are approximately cylindrical.

41. A method of winding optical fiber as in claim 26, wherein a fiber containment device is a spool.

42. A method of winding optical fiber as in claim 26, further comprising removing the fiber from the guider.

43. A method of winding optical fiber as in claim 26, wherein each end of the fiber is fixed to a separate optical component.

44. A method of winding optical fiber as in claim 43, wherein the optical components are separated by a distance of less than 25 m.

45. A method of winding optical fiber as in claim 26, further comprising retaining a portion of the fiber.

* * * * *